(12) United States Patent
Nomizo

(10) Patent No.: US 7,317,286 B2
(45) Date of Patent: Jan. 8, 2008

(54) POWER SUPPLY APPARATUS FOR DISCHARGE LAMP AND CONTROL METHOD FOR THE SAME

(75) Inventor: Mitsuru Nomizo, Nagano (JP)

(73) Assignee: Rubycon Corporation, Nagano (JP)

( * ) Notice: Subject to any disclaimer, the term of this patent is extended or adjusted under 35 U.S.C. 154(b) by 0 days.

(21) Appl. No.: 11/601,641

(22) Filed: Nov. 20, 2006

(65) Prior Publication Data
US 2007/0176565 A1 Aug. 2, 2007

(30) Foreign Application Priority Data
Jan. 31, 2006 (JP) .............................. 2006-022525

(51) Int. Cl.
*H05B 41/16* (2006.01)
(52) U.S. Cl. ................. 315/247; 315/307; 315/291; 315/224; 315/209 R; 323/207; 323/282
(58) Field of Classification Search ........... 315/247, 315/307, 291, 224, 209 R, 289, 290, 199, 315/DIG. 5, DIG. 7; 323/205–207, 280, 323/282, 285, 290
See application file for complete search history.

(56) References Cited

U.S. PATENT DOCUMENTS

| | | | | | |
|---|---|---|---|---|---|
| 5,428,268 | A | * | 6/1995 | Melis et al. ................. | 315/247 |
| 5,909,089 | A | * | 6/1999 | Deurloo et al. ............. | 315/307 |
| 6,011,361 | A | * | 1/2000 | Blankers ..................... | 315/307 |
| 6,020,691 | A | * | 2/2000 | Sun et al. ................... | 315/307 |
| 6,127,816 | A | * | 10/2000 | Hirst .......................... | 323/283 |
| 7,157,886 | B2 | * | 1/2007 | Agarwal et al. ............ | 323/207 |

FOREIGN PATENT DOCUMENTS

JP 2000-123989 A 4/2000

* cited by examiner

*Primary Examiner*—Haissa Philogene
(74) *Attorney, Agent, or Firm*—Buchanan Ingersoll & Rooney PC

(57) ABSTRACT

An apparatus supplies power to at least one discharge lamp. The apparatus includes a buck converter for regulating power supplied to at least one discharge lamp having a switching element driven by PWM pulses, and a control unit for supplying PWM pulses to the buck converter. The control unit includes a function for controlling an output power of the buck converter so as to be constant using PWM pulses of a first frequency; and a function for controlling an output voltage of the buck converter so as to be maximum using PWM pulses of a second frequency that is lower than the first frequency. The buck converter is capable of operating in discontinuous mode based on the PWM pulses of the second frequency.

10 Claims, 3 Drawing Sheets

POWER SUPPLY APPARATUS FOR DISCHARGE LAMP AND CONTROL METHOD FOR THE SAME

CROSS-REFERENCE TO RELATED APPLICATIONS

This application is based upon and claims the benefit of priority from the prior Japanese Patent Application No. 2006-22525, filed Jan. 31, 2006, the entire contents of which are incorporated herein by reference.

TECHNICAL FIELD

The present invention relates to an apparatus including a function for supplying power to lighting a discharge lamp such as a high intensity discharge lamp (HID lamp).

BACKGROUND

A power supply apparatus that uses a buck converter (a step-down converter) is known as an apparatus for lighting a discharge lamp. In a discharge lamp, there is a transition to steady state arc discharge via a glow discharge stage after breakdown. This means that the power supply apparatus needs to supply a high voltage to achieve glow discharge at the start of illumination. In addition, the power supply apparatus needs to supply a sufficient power to maintain the arc discharge at the transition from glow discharge to arc discharge.

In Japanese Laid-Open Patent Publication No. 2000-123989, a discharge lamp lighting device is disclosed where the capacitance of a smoothing capacitor is reduced at the start of illumination so that sufficient energy is supplied, and then in the steady state following the transition to arc discharge, the capacitance of the capacitor is increased to reduce high-frequency ripple components.

Among power supply apparatuses that include a buck converter, apparatuses that do not have a boost (i.e., step-up) function have a simple construction and can be made compact, but are incapable of outputting a higher voltage than the input voltage. In the case of an HID lamp used as a light source of a projector or the like, it is necessary to supply a voltage of around 200V during the glow discharge stage at the start of illumination. It is also necessary to illuminate the HID lamp stably every time, even if the input voltage is low.

PWM (pulse-width modulation)-type buck converters are often used in power supply apparatuses. By using such type of buck converter, in addition to the merit of regulating the power by changing the duty of PWM pulses with a constant frequency and having a proven record in actual use, it is possible to operate with a high frequency to prevent resonance for an HID lamp. However, in a continuous mode where a current flows continuously through the choke coil (i.e., inductor), as shown by Equation (1) below, it is only possible to output an output voltage Vo determined by the duty ratio of the (Ton/(Ton+Toff)) of the input voltage Vi (Ton is a time where a switch is on by the PWM pulses and Toff is a time where the switch is off by the PWM pulses). In a buck converter where condition such as the inductance L of the choke coil, is selected as to produce a discontinuous mode (intermittent mode) for a current Io of the magnitude that flows during glow discharge, current flows discontinuously (i.e., intermittently) through the choke coil and a higher output voltage Vo than the duty ratio of the input voltage Vi can be outputted as shown by Equation (2) below.

$$Vo = Ton/(Ton+Toff) \times Vi \quad (1)$$

$$Vo = (Vi \cdot Ton)^2 / (Vi \cdot Ton^2 + 2 \cdot Io \cdot L(Ton+Toff)) \quad (2)$$

Equations (1) and (2) above respectively show the output voltage Vo in continuous mode (where $Io > (Vo/(2 \cdot L) \cdot Toff)$) and the output voltage Vo in the discontinuous mode (where $Io < (Vo/(2 \cdot L) \cdot Toff)$) of a typical buck converter.

During the transition from glow discharge to arc discharge, the current Io increases due to the addition of a thermal electron flow, and as a result, the discharge voltage (i.e., the output voltage) Vo falls. During the transition, the current supplying performance of the power supply apparatus in a high-voltage range has a large effect on the ease with which the lamp can be lit. However, it is difficult to achieve both a high output voltage Vo and a high output current Io in discontinuous mode. When the output current Io is increased, the output voltage Vo falls, and it also becomes easy for the buck converter to change to operating in continuous mode.

SUMMARY

According to a first aspect of the present invention, a method of controlling an apparatus is provided. The apparatus includes a buck converter for regulating power supplied to at least one discharge lamp and the buck converter includes a switching element driven by PWM pulses. The method comprising:

regulating an output power of the buck converter so as to be constant using PWM pulses of a first frequency; and regulating, prior to the regulating the output power, an output voltage of the buck converter so as to be a target voltage using PWM pulses of a second frequency that is lower than the first frequency and operating the buck converter in discontinuous mode (intermittent mode).

According to this method, in starting of illumination of the discharge lamp, PWM pulses of the second frequency that is lower than the first frequency are used to cause the buck converter to operate in discontinuous mode and a duty of the PWM pulses of the second frequency is controlled so that the output voltage of the buck converter becomes a target voltage. Thereafter a duty of the PWM pulses of the first frequency is controlled so that the output power of the buck converter becomes constant.

In accordance with a second aspect of the present invention, there is provided a method of controlling the apparatus. The method comprising:

regulating an output power of the buck converter so as to be constant using PWM pulses of a first frequency; and regulating, prior to the regulating the output power, an output voltage of the buck converter so as to be maximum using PWM pulses of a second frequency that is lower than the first frequency and operating the buck converter in discontinuous mode.

According to this method, in starting of illumination of the discharge lamp, PWM pulses of the second frequency that is lower than the first frequency are used to cause the buck converter to operate in discontinuous mode and a duty of the PWM pulses of the second frequency are controlled to maximize the output voltage of the buck converter.

In these methods, frequency of the PWM pulses is different between the supplying of power for starting of illumination (where the power for starting the glow discharge is supplied) and the supplying of power after the transition to arc discharge. The frequency of the PWM pulses is lowered at the starting of illumination. In these methods, it is possible to increase the output current of the buck converter at the starting of illumination so as to prevent the buck converter from switching to continuous mode. Accordingly, it is possible to improve the current supplying performance while controlling the buck converter with the higher output voltage.

By increasing the output current during the transition from glow discharge to arc discharge, the operation mode of the buck converter is changed to continuous mode. Controlling the pulsewidth of the PWM pulses, that is, controlling the duty to switch from the maximum voltage to constant power, and switching the frequency of the PWM pulses may be simultaneously performed with the changing of operation mode. These two processes of the controlling and the switching may be carried out sequentially, which makes it easy to supply even more stabilized power to the discharge lamp. In between the regulating the output voltage at the starting of illumination with the PWM pulses of the second frequency and the regulating the output power with the PWM pulses of the first frequency, these methods may further comprise a step of regulating, using PWM pulses of the second frequency, the output power of the buck converter so as to be constant. That is, it is preferable for the methods to include a step of controlling a duty of the PWM pulses of the second frequency to make the output power of the buck converter constant. When the output voltage has fallen to a predetermined voltage or below due to the increase in the discharge current, it is possible to switch the duty control of the PWM pulses to constant power control, and when a predetermined period has elapsed following the start of supplying power to the discharge lamp, it is possible to switch the frequency of the PWM pulses. If the output voltage has not fallen to the predetermined voltage or below when the predetermined period has elapsed, it may be judged that illumination has failed and the illumination process may be retried or the process may be cancelled due to illumination failure.

According to one of other aspects of the present invention, an apparatus is provided. The apparatus includes a buck converter for regulating power supplied to at least one discharge lamp, which includes a switching element driven by PWM pulses, and a control unit for supplying the PWM pulses to the buck converter. The control unit includes a function for controlling an output power of the buck converter so as to be constant using PWM pulses of a first frequency and a function for controlling an output voltage of the buck converter so as to be maximum using PWM pulses of a second frequency that is lower than the first frequency. The buck converter is capable of operating in discontinuous mode based on the PWM pulses of the second frequency. This control unit can control the duty of the PWM pulses of the second frequency so that the output voltage of the buck converter becomes the target voltage, i.e., the maximum voltage, thereby causing the buck converter to operate in the discontinuous mode. Accordingly, the apparatus can produce a sufficiently high voltage for the starting of illumination and has sufficient current supplying performance. The control unit should preferably also have a function for controlling the power output of the buck converter so as to be constant t using PWM pulses of the second frequency.

One of the embodiments of the apparatus is a power supply unit for supplying power to the at least one discharge lamp. One of the other embodiments of the apparatus is a lighting system that includes the at least one discharge lamp. Further one of the other embodiments of the apparatus is a projector that includes the at least one discharge lamp.

According to further one of aspects of the present invention, a program product for controlling an apparatus is provided. The apparatus includes a buck converter, which includes a switching element driven by PWM pulses and carries out control of the power supplied to the discharge lamp, and a control unit for supplying the PWM pulses to the buck converter. The program product includes comprising:

regulating, by the control unit, an output power of the buck converter so as to be constant using PWM pulses of a first frequency; and regulating, prior to the regulating the output power, by the control unit, an output voltage of the buck converter so as to be maximum using PWM pulses of a second frequency that is lower than the first frequency and operating the buck converter in discontinuous mode.

The program product can be provided by being recorded onto a suitable recording medium such as a ROM that is readable by a microcomputer and/or a processor.

DETAILED DESCRIPTION

Figure 1:
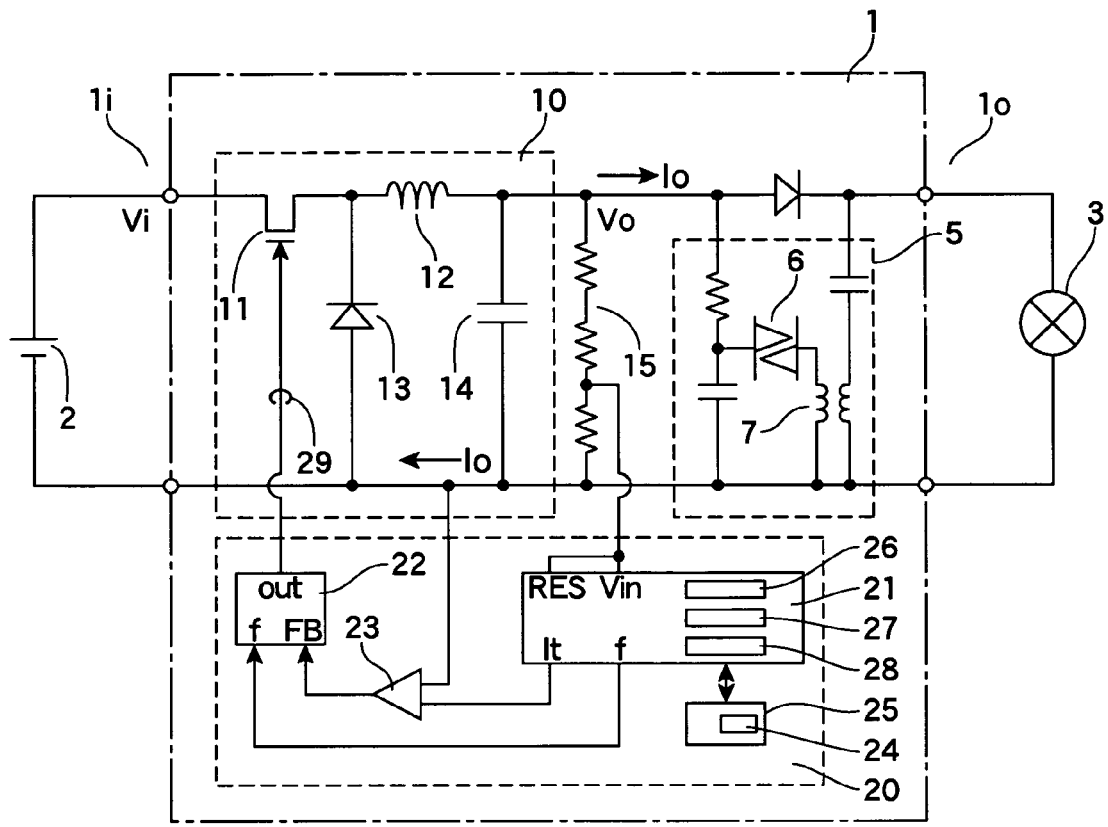
FIG. 1 is a circuit diagram showing the configuration an apparatus.

FIG. 1 shows the configuration of a power supply apparatus according to a first embodiment of the present invention. This power supply apparatus 1 has a function for supplying power from a DC power supply 2 connected to an input side 1$i$ of the apparatus 1 to an HID lamp (discharge lamp) 3 connected to an output side 1$o$ of the apparatus 1 to light the discharge lamp 3. The power supply apparatus 1 includes a buck converter 10 that includes a switching element 11 driven by PWM pulses and regulates the power supplied to the discharge lamp 3, a control unit 20 that controls the buck converter 10 by supplying the PWM pulses, and a high-voltage generating circuit 5 that supplies a high voltage to the discharge lamp 3 to cause dielectric breakdown. The high-voltage generating circuit 5 is a high voltage DC-DC conversion circuit equipped with a SIDAC (Silicon Diode for AC, in Japan a registered trademark of Shindengen) 6 and a high-voltage transformer 7, and is capable of applying a voltage of several kV to the discharge lamp 3.

The buck converter 10 is a step-down converter that outputs a lower voltage Vo than the input voltage Vi. A typical buck converter 10 is equipped with the switching element 11 used for chopping, a choke coil 12, a flywheel diode 13, and a smoothing capacitor 14.

The control unit 20 includes an IC (control IC) 21 equipped with functions for voltage control and power control and a PWM pulse controller 22 that outputs PWM pulses 29 whose pulsewidth has been changed based on a feedback signal FB from the control IC 21. In the control unit 20, the control IC 21 detects the output voltage Vo using a voltage detecting circuit 15 provided on the output side of the buck converter 10, the control IC 21 outputs a target current It corresponding to a power set in advance, then, a result of a comparator 23 comparing the target current It with the current Io flowing through the buck converter 10 is supplied to the PWM pulse controller 22 as the feedback signal FB. The PWM pulse controller 22 outputs the PWM pulses 29 with a frequency f designated by the control IC 21 and changes the pulsewidth to appropriately control the duty of the PWM pulses 29.

A number of functions are implemented on the control IC 21 by loading a program 24 from a ROM 25. One of the functions realized by the control IC 21 is a first control function 26 that causes the PWM pulse controller 22 to output PWM pulses 29 that have a first frequency (a standard frequency) f0 and a duty that makes the output power of the buck converter 10 constant. This steady-state control function 26 can supply a constant power, which is suited to lighting the discharge lamp 3 in the steady state, via the buck converter 10.

Another function realized by the control IC 21 is an illumination-start control function 27 that causes the PWM pulse controller 22 to output PWM pulses 29 that have a second frequency (an initial frequency) fi that is lower than the standard frequency f0 (for example, the initial frequency fi that is half the standard frequency f0) and a duty that makes the output voltage Vo of the buck converter 10 equal to the target voltage, which in the present embodiment is the maximum voltage. This function 27 can supply, via the buck converter 10, a sufficiently high voltage and current to maintain glow discharge at the start of illumination of the discharge lamp 3. The inductance L of the choke coil 12 is selected so that when the buck converter 10 is driven by the PWM pulses 29 with the initial frequency fi and a duty controlled so that the output voltage Vo is maximized at an output current 10 in the glow discharge range, the buck converter 10 operates in discontinuous mode (intermittent mode) where the current flowing through the choke coil 12 is discontinuous.

Another function realized by the control IC 21 is a second control function 28 that causes the PWM pulse controller 22 to output PWM pulses 29 that have the initial frequency fi (i.e., the second frequency) and a duty that makes the output power of the buck converter 10 constant.

Figure 2:
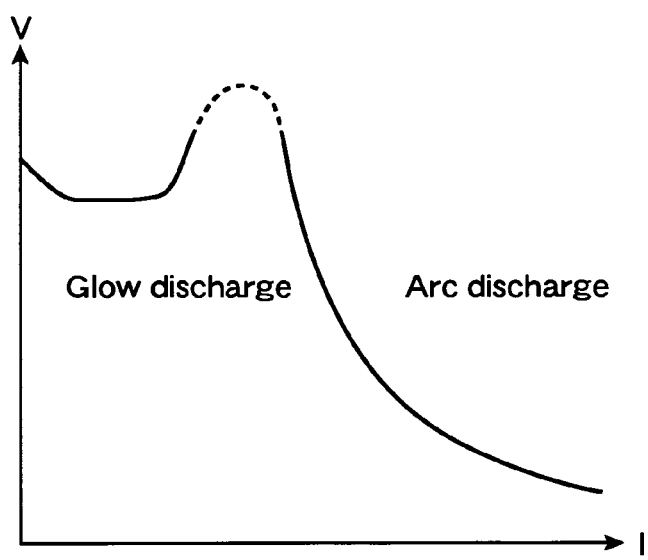
FIG. 2 is a graph showing a transition from glow discharge to arc discharge for a discharge lamp.

FIG. 2 shows a state where the discharge lamp 3 is lit. Glow discharge by the discharge lamp 3 starts when a high voltage is supplied and dielectric breakdown occurs. When thermal electrons are emitted due to the heat caused by dielectric breakdown and the glow discharge, there is a transition from glow discharge to arc discharge and the discharge lamp 3 becomes stabilized. To maintain the glow discharge, the power supply apparatus 1 needs to apply a high voltage of around 200 to 250V to the discharge lamp 3. After this, during the transition from glow discharge to arc discharge, the power supply apparatus 1 needs to have a current supplying performance that can cope with the increase in current that accompanies the emission of thermal electrons. At the start of illumination of the discharge lamp 3, by the illumination-start control function 27 of the control unit 20, the power supply apparatus 1 is controlled so that the output voltage Vo of the buck converter 10 is maximized using the PWM pulses 29 with the low initial frequency fi up to a transition in the state of the discharge lamp 3 from glow discharge to arc discharge. When the output current 10 increases and the output voltage Vo falls, the power supply unit 1 switches to constant power control. That is, by the second control function 28 of the control unit 20, the power supply apparatus 1 is controlled so that the output power (Vo·Io) becomes constant using the PWM pulses 29 with the initial frequency fi. After a predetermined period has elapsed, by the first control function 26, then the power supply apparatus 1 is controlled using the PWM pulses 29 with the standard frequency f0 produced so that the output power becomes constant.

Figure 3:
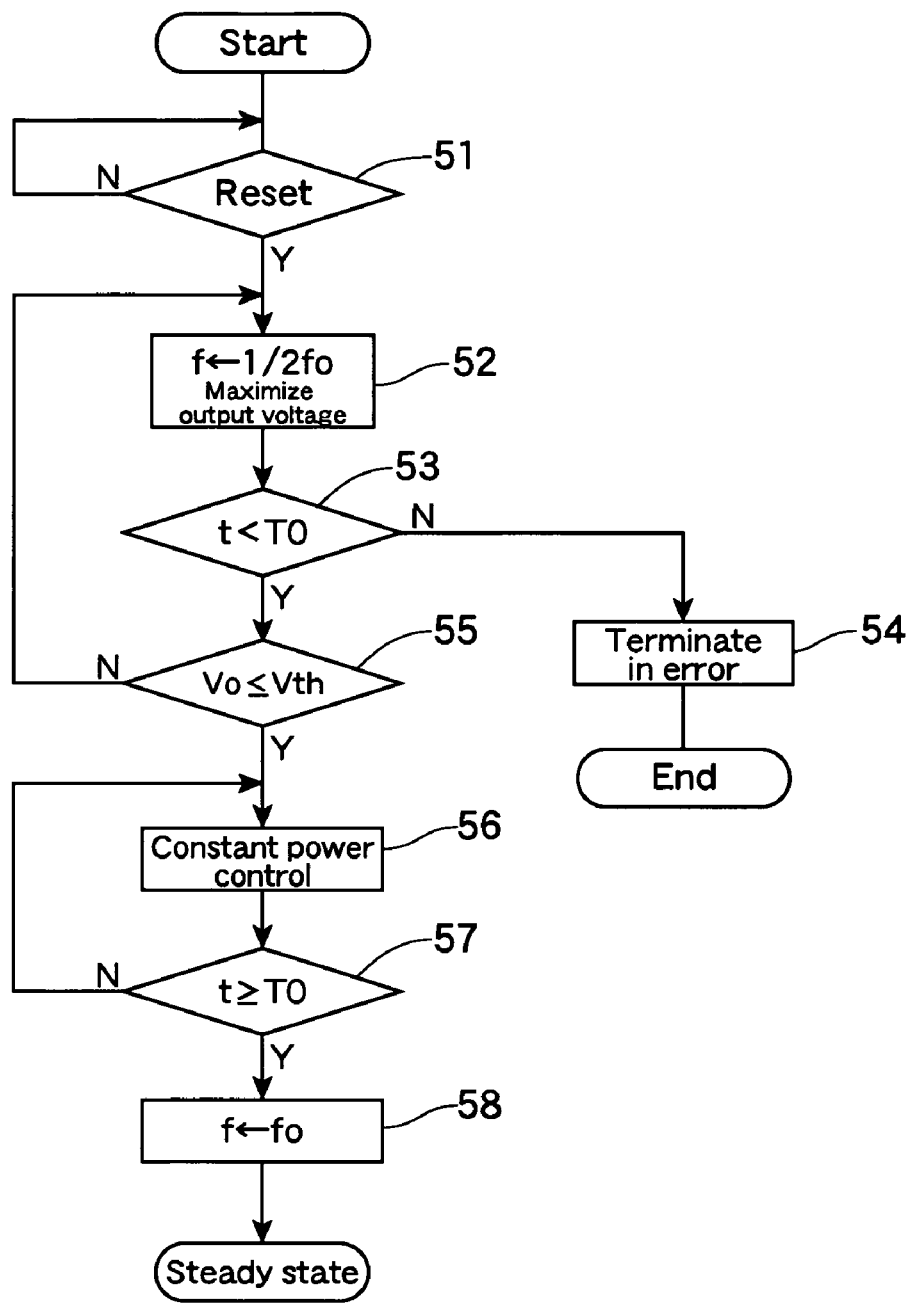
FIG. 3 is a flowchart showing the operation of an apparatus at a start of illumination.
Figure 4:
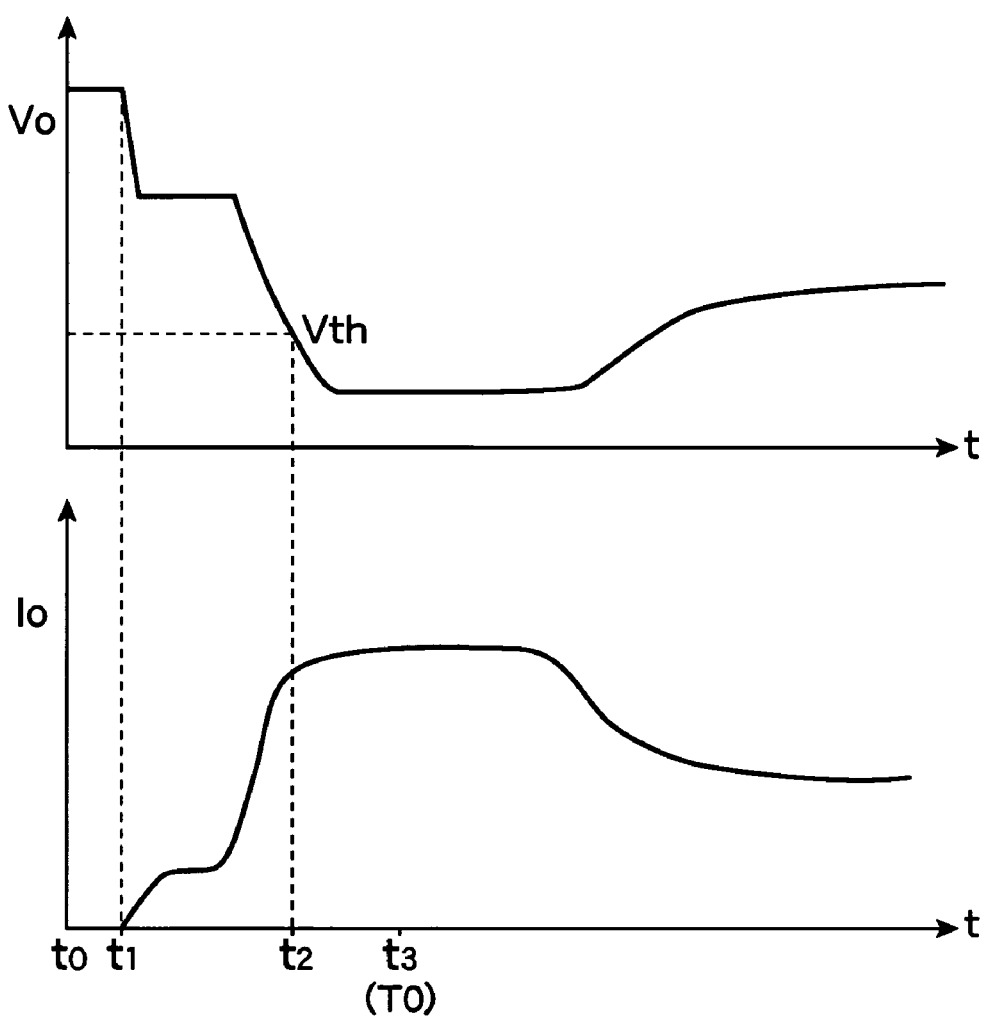
FIG. 4 includes graphs showing characteristics of the output voltage and the output current at the start of illumination.

FIG. 3 is a flowchart showing the operation when the power supply apparatus 1 lights the discharge lamp 3. FIG. 4 shows the overall changes in the output voltage Vo of the buck converter 10 and the current Io at the start of illumination. In step 51, when DC power is supplied to the input side 1i of the power supply apparatus 1, the control IC 21 is reset by the initial input voltage establishment and a process for lighting the discharge lamp 3 is commenced.

In an illumination start step 52, the control IC 21 carries out the illumination-start control function 27 to set the frequency f of the PWM pulses 29 at the initial frequency fi that is lower than the standard frequency (base frequency) f0. In this embodiment, the initial frequency fi of the PWM pulses 29 is set at half the standard frequency f0. As one example, the standard frequency f0 is 70 kHz. The control IC 21 outputs the target current It so that the PWM pulses 29 are set with a duty that maximizes the output voltage Vo of the buck converter 10. That is, in step 51, the control IC 21 has the maximum output voltage Vo relative to the input voltage Vi outputted from the power supply apparatus 1 (a step of regulating the output voltage using PWM pulses of the second frequency for the present invention). To do so, the control IC 21 outputs the highest or maximum target current It so that the PWM pulses 29 with the maximum duty ratio are outputted from the PWM pulse controller 22.

When a high voltage is outputted from the buck converter 10, a high voltage for causing dielectric breakdown is generated by the high-voltage generating circuit 5 and is applied to the discharge lamp 3. When glow discharge starts at the time t1 and current flows out of the discharge lamp 3, the output voltage Vo of the buck converter 10 is applied to the discharge lamp 3. Since only a discharge current flows in the glow discharge region, the output current 10 of the buck converter 10 controlled by the PWM pulses 29 with the maximum duty ratio is small, the buck converter 10 operates in discontinuous mode, and the voltage required for glow discharge, typically, a voltage of around 200V, is supplied. When the discharge lamp 3 heats up due to the glow discharge and the emission of thermal electrons commences, the current flowing in the discharge lamp 3 suddenly increases. At this stage, if there is insufficient current supplying performance for the discharge lamp 3, there will be no smooth transition to arc discharge, the discharge will dissipate, and a transition from breakdown to glow discharge and then arc discharge will be repeated. Also, if the buck converter 10 moves to continuous mode due to the increase in current, the output voltage Vo of the buck converter 10 will fall, so that it will not be possible to maintain the glow discharge and/or to cause a transition from glow discharge to arc discharge, resulting in discharge dissipating in the same way as described above. Accordingly, unless the input voltage Vi is sufficiently high, a smooth transition from glow discharge to arc discharge is not possible.

On the other hand, with the power supply apparatus 1, at the start of illumination the buck converter 10 is driven by low-frequency PWM pulses 29 so that the range of the output current for which the buck converter 10 can operate in discontinuous mode can be increased. That is, by lowering the frequency of the PWM pulses 29, the buck converter 10 is caused to operate in the discontinuous mode, thereby improving the current supplying performance in the mode where a high voltage (the maximum voltage) can be supplied. Accordingly, even if the input voltage Vi is low, it will still be possible to supply the high voltage and the large current required for a transition from glow discharge to arc discharge from the buck converter 10. This means that even if the input voltage is comparatively low, the power supply apparatus 1 will still be able to supply the discharge lamp 3 with sufficient power for the start of illumination.

If the output voltage Vo has fallen to a predetermined voltage Vth or below at time t2 due to the transition to arc discharge, this is detected in step 55. In step 56, the power supply apparatus 1 switches to control by the second control function 28 of the control IC 21 to make the power constant (a step of regulating the output power using PWM pulses of the second frequency (second process) for the present invention). If the output voltage Vo does not reach the predetermined voltage Vth within a predetermined period T0, it is assumed that the transition to arc discharge was not possible. Accordingly, step 53 detects whether the period T0 has elapsed and if so, in step 54, the illumination process of the discharge lamp 3 terminates in error.

During the constant power control in step 56, the control IC 21 uses a function or a lookup table to calculate the target current It for making the power constant from the output voltage Vo of the buck converter 10, and outputs the target current It. The PWM pulse controller 22 then controls the duty of the PWM pulses 29 so that the output current 10 matches the target current It.

In step 57, it is detected whether a time t3, which is the predetermined period T0 following the resetting of the control IC 21, has been reached. If so, in step 58 the first control function 26 of the control IC 21 has the PWM pulse controller 22 set the frequency of the PWM pulses 29 at the standard frequency f0 to switch to control where the power is made constant using PWM pulses 29 with the standard frequency f0 (a step of regulating the output power using PWM pulses of the first frequency (first process) for the present invention).

As arc discharge continues, the discharge lamp 3 heats up to a steady-state temperature, and in many cases becomes stable with the output current Io slightly decreased and the output voltage Vo slightly increased. By increasing the frequency of the PWM pulses 29 in the steady-state control function 26, even if the load fluctuates for some reason, resulting in a drop in the output current Io, a situation where the buck converter 10 switches to discontinuous mode and the output voltage Vo increases can be prevented. Also, by making the frequency of the PWM pulses 29 sufficiently higher than the resonance frequency of the discharge lamp 3, it is possible to prevent the production of noise and the like.

As shown in FIG. 3, the operation of the control IC 21 for illuminating the discharge lamp 3 is realized by the program (firmware) 24 stored in the ROM 25 and/or other media that is IC readable. The program 24 or program product can be changed according to the type of discharge lamp 3 to which the power supply apparatus 1 is to supply power. Accordingly, it is possible to change the program 24 so that the buck converter 10 is controlled by PWM pulses 29 with a standard frequency f0 and an initial frequency fi, which is lower than the standard frequency f0, that are suited to any type of discharge lamp 3. Such program can be provided by recording the program on a suitable computer or processor readable recording medium, such as a CD-ROM.

The embodiments described may be varied in a wide variety of ways. One of the other embodiments of the apparatus of this invention is a lighting system, such as a light source of projector, that includes the at least one discharge lamp. Further one of the other embodiments of the apparatus is a projector that includes the at least one discharge lamp and projection lens system.

What is claimed is:

1. A method of controlling an apparatus, the apparatus including a buck converter for regulating power supplied to at least one discharge lamp, the buck converter including a switching element driven by PWM pulses,
the method comprising:
regulating an output power of the buck converter so as to be constant using PWM pulses of a first frequency; and
regulating, prior to the regulating the output power, an output voltage of the buck converter so as to be a target voltage using PWM pulses of a second frequency that is lower than the first frequency and operating the buck converter in discontinuous mode.

2. The method according to claim 1, further comprising:
regulating, in between the regulating the output voltage and the regulating the output power, using PWM pulses of the second frequency, the output power of the buck converter so as to be constant.

3. A method of controlling an apparatus, the apparatus including a buck converter for regulating power supplied to at least one discharge lamp, the buck converter including a switching element driven by PWM pulses,
the method comprising:
regulating an output power of the buck converter so as to be constant using PWM pulses of a first frequency; and
regulating, prior to the regulating the output power, an output voltage of the buck convert so as to be maximum using PWM pulses of a second frequency that is lower than the first frequency and operating the buck converter in discontinuous mode.

4. The method according to claim 3, further comprising:
regulating, in between the regulating the output voltage and the regulating the output power, using PWM pulses of the second frequency, the output power of the buck converter so as to be constant.

5. An apparatus comprising:
a buck converter for regulating power supplied to at least one discharge lamp, the buck converter including a switching element driven by PWM pulses; and
a control unit for supplying PWM pulses to the buck converter, the control unit including:
a function for controlling an output power of the buck converter so as to be constant using PWM pulses of a first frequency; and
a function for controlling an output voltage of the buck converter so as to be maximum using PWM pulses of a second frequency that is lower than the first frequency, the buck converter being capable of operating in discontinuous mode based on the PWM pulses of the second frequency.

6. The apparatus according to claim 5, wherein the control unit further including:
a function for controlling, using the PWM pulses of the second frequency, the output power of the buck converter so as to be constant.

7. The apparatus according to claim 5 being a power supply unit for supplying power to the at least one discharge lamp.

8. The apparatus according to claim 5 being a lighting system and further including the at least one discharge lamp.

9. The apparatus according to claim 5 being a projector and further including the at least one discharge lamp.

10. A program product for controlling an apparatus, the apparatus including: a buck converter with a switching element driven by PWM pulses for regulating power supplied to at least one discharge lamp; and a control unit for supplying PWM pulses to the buck converter,
the program product comprising:
regulating, by the control unit, an output power of the buck converter so as to be constant using PWM pulses of a first frequency; and
regulating, prior to the regulating the output power, by the control unit, an output voltage of the buck converter so as to be maximum using PWM pulses of a second frequency that is lower than the first frequency and operating the buck converter in discontinuous mode.

* * * * *